United States Patent
Sinha

(10) Patent No.: US 10,671,954 B2
(45) Date of Patent: Jun. 2, 2020

(54) SELECTIVE REMINDERS TO COMPLETE INTERRUPTED TASKS

(71) Applicant: Google Inc., Mountain View, CA (US)

(72) Inventor: Siddhartha Sinha, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 365 days.

(21) Appl. No.: 14/629,242

(22) Filed: Feb. 23, 2015

(65) Prior Publication Data

US 2016/0247110 A1 Aug. 25, 2016

(51) Int. Cl.
| | | |
|---|---|---|
| G06Q 10/06 | (2012.01) | |
| G06N 20/00 | (2019.01) | |
| G06F 9/46 | (2006.01) | |
| G06Q 10/10 | (2012.01) | |

(52) U.S. Cl.
CPC ....... *G06Q 10/06316* (2013.01); *G06N 20/00* (2019.01); *G06Q 10/06* (2013.01); *G06Q 10/10* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 6,301,338 B1 | 10/2001 | Makela et al. | |
| 7,233,229 B2 | 6/2007 | Stroupe et al. | |
| 8,190,213 B2 | 5/2012 | Sierawski | |
| 8,195,584 B2 | 6/2012 | Kamar et al. | |
| 8,352,561 B1 | 1/2013 | Denise | |
| 8,825,836 B1* | 9/2014 | Gibson | H04L 51/24 455/412.2 |
| 2001/0029175 A1 | 10/2001 | Sellen et al. | |
| 2006/0179023 A1 | 8/2006 | Lau et al. | |
| 2007/0166672 A1* | 7/2007 | Morita | G09B 19/00 434/118 |
| 2007/0192174 A1* | 8/2007 | Bischoff | G06F 19/3418 340/573.1 |
| 2008/0004926 A1 | 1/2008 | Horvitz et al. | |

(Continued)

FOREIGN PATENT DOCUMENTS

| | | |
|---|---|---|
| CN | 1765136 | 4/2006 |
| CN | 101702127 | 5/2010 |

(Continued)

OTHER PUBLICATIONS

International Search Report and Written Opinion of PCT Serial No. PCT/US16/018079, dated Apr. 26, 2016.

(Continued)

*Primary Examiner* — Daniel T Pellett
(74) *Attorney, Agent, or Firm* — Middleton Reutlinger

(57) ABSTRACT

Methods, apparatus, systems, and computer-readable media are provided for obtaining user interaction data indicative of interaction by a user with an application executing on a computing device, determining, based on the user interaction data, a likelihood that the user failed to complete a task the user started with the application executing on the computing device, and selectively causing, based on the likelihood, a task-completion reminder to be presented to the user in a manner selected based at least in part on historical reminder consumption.

15 Claims, 5 Drawing Sheets

(56) References Cited

U.S. PATENT DOCUMENTS

| | | | |
|---|---|---|---|
| 2008/0005055 A1* | 1/2008 | Horvitz | G06Q 10/04 706/62 |
| 2008/0177726 A1* | 7/2008 | Forbes | G06Q 30/02 |
| 2011/0126050 A1* | 5/2011 | Begole | G06Q 10/10 714/18 |
| 2014/0115456 A1* | 4/2014 | White | G10L 15/22 715/708 |
| 2016/0210698 A1 | 7/2016 | Ueda | |

FOREIGN PATENT DOCUMENTS

| | | |
|---|---|---|
| CN | 102801856 | 11/2012 |
| JP | 2006113744 | 4/2006 |
| JP | 5599537 | 10/2014 |
| KR | 1020140056753 | 5/2014 |

OTHER PUBLICATIONS

Korean Intellectual Property Office; Office Action issued in Application No. 10-2017-7026921 dated Jul. 31, 2018.
Japan Patent Office; Office Action issued in Application No. 2017-544601, dated Sep. 10, 2018.
Japan Patent Office; Office Action issued in Application No. 2017-544601 dated Apr. 22, 2019.
The Korean Intellectual Property Office; Notice of Allowance issued in Application No. 10-2017-7026921 dated Feb. 27, 2019.
Japan Patent Office; Decision of Rejection issued in Application No. 2017-544601, 14 pages, dated Dec. 2, 2019.
European Patent Office; Communication Pursuant to Article 94(3) Epc issued in Application No. 1670854t4, 7 pages, dated Dec. 6, 2019.
China National Intellectual Property Administration; Office Action issue in Application No. CN201680011423.0; dated Mar. 4, 2020.

* cited by examiner

SELECTIVE REMINDERS TO COMPLETE INTERRUPTED TASKS

BACKGROUND

Mobile computing devices such as smart phones, tablet computers, and wearable computing devices may be used to perform a wide variety of tasks. These tasks may include but are not limited to drafting emails and text messages, making voice and video phone calls, creating tasks and calendar entries, updating social network status, playing games, and so forth. However, a user may be interrupted mid-task, and in some instances may be sidetracked to doing something else, which may result in the user forgetting to complete the task later. For example, a user may be interrupted (e.g., by a phone call) while creating a calendar entry, so that for instance, the entry has an event title and date, but lacks other perhaps essential data points, such as a location and start time. As another example, a user interrupted while operating a social networking application to update her status may forget to later come back and complete/submit her status update. Mobile computing devices in particular typically include relatively small displays that make switching between contexts (e.g., from one application to another) fairly dramatic, as opposed to computing devices with larger screens that typically display multiple applications at once. Thus, switching applications on a mobile computing device (e.g., to take an incoming phone call) is more likely to result in a user forgetting to complete a task.

SUMMARY

The present disclosure is generally directed to methods, apparatus, and computer-readable media (transitory and non-transitory) for identifying one or more events that may be suggestive of a user being interrupted while performing a task using a particular application operating on a computing device. A likelihood that the user failed to complete the task may be determined, e.g., based on historical user interaction data. A task-completion reminder may be selectively provided to the user based on the likelihood, e.g., in a manner selected based on historical consumption data.

In various implementations, in contrast to existing systems which require substantial user overhead to create and maintain task-completion reminders (or "to do" lists), systems employing techniques described herein may "learn" over time how to automatically identify incomplete tasks and how to present task-completion reminders to users, reducing user overhead. Additionally, techniques described herein may operate across application boundaries, minimizing computational resources that might otherwise be required to manage task-completion reminders on a per-application basis.

In some implementations, a computer implemented method may be provided that includes the steps of: obtaining, by a computing system, user interaction data indicative of interaction by a user with an application executing on a computing device; determining, by the computing system based on the user interaction data, a likelihood that the user failed to complete a task the user started with the application executing on the computing device; and selectively causing, by the computing system based at least in part on the likelihood, a task-completion reminder to be presented to the user.

This method and other implementations of technology disclosed herein may each optionally include one or more of the following features.

In various implementations, the method may further include selecting a manner in which the task-completion reminder is presented to the user based at least in part on historical reminder consumption. In various implementations, determining the likelihood may include determining that a state machine associated with the application has reached a particular state. In various implementations, the user interaction data may include one or more snapshots of the application. In various implementations, determining the likelihood may include determining the likelihood based on historical application interaction data associated with the application. In various implementations, determining the likelihood may be performed using a machine learning classifier. In various implementations, the classifier may be trained on a plurality of instances of user interaction with the application known to be associated with incomplete tasks.

In various implementations, the method may further include modifying the machine learning classifier based on feedback from the user indicative of accuracy of the likelihood. In various implementations, determining the likelihood may include performing natural language processing on text input by the user to the application to identify one or more sentence fragments authored by the user using the application. In various implementations, the method may include selecting the manner in which the task-completion reminder is presented to the user using a machine learning classifier. In various implementations, the machine learning classifier may be trained on a plurality of instances of task-completion reminder consumption. In various implementations, the method may further include modifying the machine learning classifier based on feedback indicative of consumption by the user of the task-completion reminder.

In various implementations, the application may be a first application, and the operations of obtaining and determining may be performed by a second application that is distinct from the first application.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
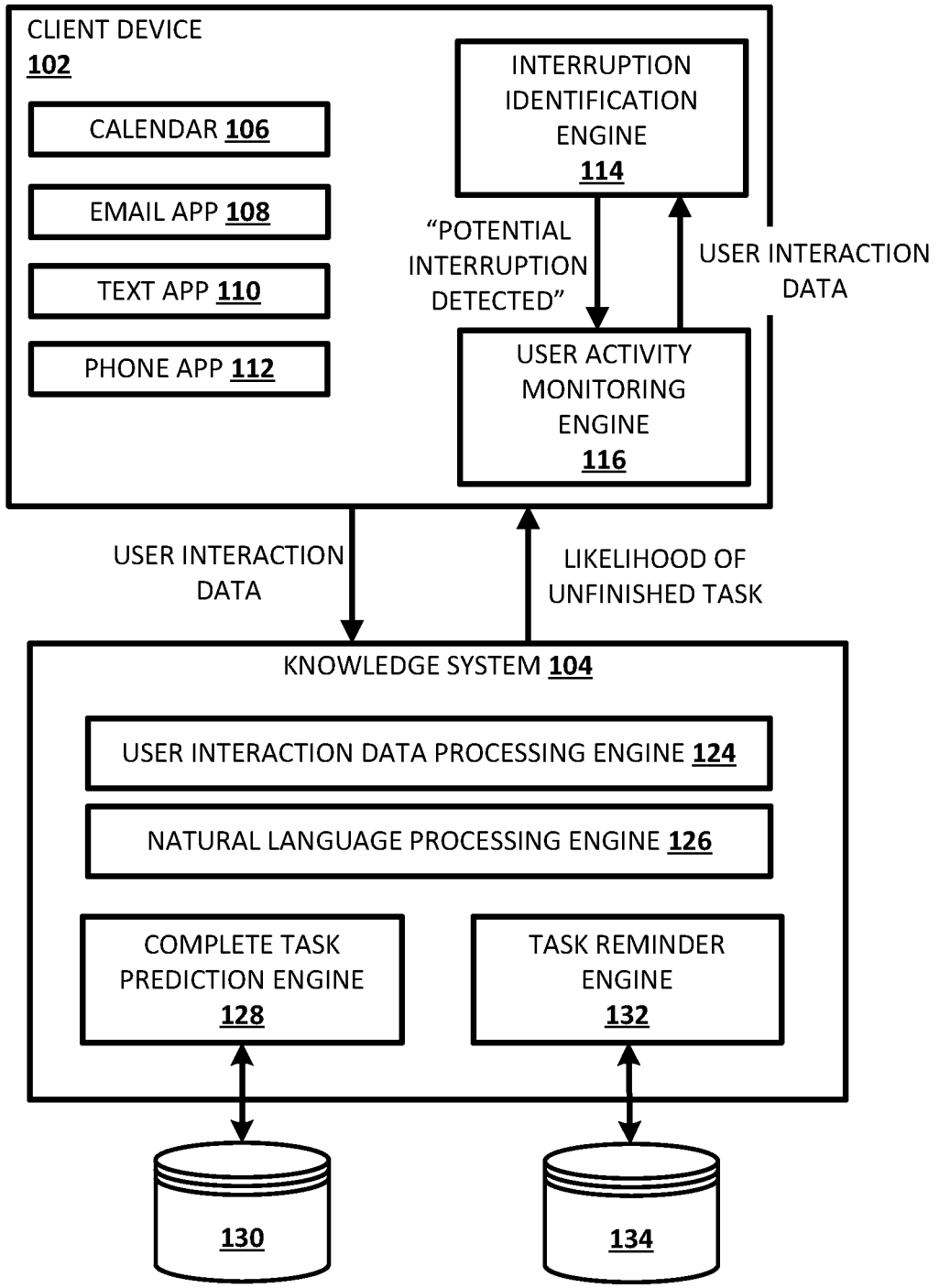
FIG. 1 illustrates schematically an example environment in which complete and/or incomplete tasks may be identified, and in which task-completion reminders may be generated and provided to users, in accordance with various implementations.

FIG. 1 illustrates an example environment that includes a client device 102 and a knowledge system 104. In an environment such as that depicted in FIG. 1, user interaction with one or more applications executing on client device 102 may be analyzed to determine a likelihood a user was interrupted while performing a task using the application, a likelihood the user failed to complete the task, and/or a manner in which to provide the user with a reminder to complete the incomplete task.

Client device 102 may be a computer communicatively coupled to the knowledge system 104 through a network (not depicted) such as a local area network (LAN) or wide area network (WAN) such as the Internet. Client device 102 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. Client device 102 may include one or more applications (or "apps") to facilitate performance of various tasks. For example, client device 102 may execute a calendar application 106, an email application 108, a text messaging application 110, a telephone application 112, and so forth.

Client device 102 and knowledge system 104 each may include memory for storage of data and software applications, one or more processors for accessing data and executing applications, and components that facilitate communication over a network. In some implementations, operations performed by client device 102 and/or knowledge system 104 may be distributed across multiple computer systems. Knowledge system 104 may be implemented as, for example, computer programs running on one or more computers in one or more locations that are communicatively coupled to each other through a network (not depicted).

In various implementations, client device 102 may execute one or more applications configured to facilitate identification of incomplete, possibly-interrupted tasks started by a user using one or more applications (e.g., 106-112) executing on client device 102. For example, in FIG. 1, client device 102 operates an interruption identification engine 114 and a user activity monitoring engine 116. In various implementations, these applications may be distinct from, and/or operate separately of, applications 106-112. In other implementations, one or more of engines 114 and 116 may be omitted, combined into a single engine, and/or operated elsewhere, such as on knowledge system 104.

In various implementations, interruption identification engine 114 may be configured to identify, based on user interaction with client device 102, occurrence of an event that suggests the user has been interrupted while performing a task associated with one or more applications (e.g., 106-112) executing on client device 102. Interruption identification engine 114 may identify user-interrupting events based on various data, such as historical data and/or user preferences. For example, if users in general (or one user in particular) tend to later revisit a first application very soon after transitioning from the first application (e.g., email application 108) to a second application (e.g., phone application 112), that may suggest that users operating the first application are often interrupted by the second application. In some implementations, interruption identification engine 114 may employ one or more machine learning classifiers trained on instances of known user interruption to identify occurrence of an event that suggests a user has been interrupted while performing a task.

Various types of events may suggest that a user has been interrupted while performing a task. As alluded to above, one type of event is a transition between applications on client device 102. For example, a user operating text messaging application 110 to draft a text may receive a phone call. The user may switch from text messaging application 110 to phone application 112 to participate in the call without completing the text message. Another type of event that may suggest user interruption is passage of at least a predetermined time interval without user interaction with an application. For example, a user may be in the process of creating a calendar entry, but prior to saving the entry may stop for several minutes, e.g., to speak to someone passing by. Yet another type of event that may suggest user interruption is transition of client device 102 to a standby state. This may occur, for instance, when a user fails to operate any input of client device 102 for a predetermined time interval (causing client device 102 to automatically transition to standby mode to save power), or by a user deliberately transitioning client device 102 into a standby mode (e.g., when the lights dim in a movie theatre or prior to takeoff). Yet another type of event is a user clicking, for instance, a soft key to take the user to her "home" screen.

User activity monitoring engine 116 may be configured to collect data indicative of user interaction with one or more applications (e.g., 106-112). In various implementations, a user of client device 102 may opt into (or out of) such monitoring, e.g., on an application-by-application basis, during particular time intervals (e.g., during business hours), when in network communication (e.g., when a cellular or Wi-Fi signal is available), and so forth. In various implementations, a user may adjust various parameters related to monitoring performed by user activity monitoring engine 116. For example, a user may be able to configure user activity monitoring engine 116 to censor, encrypt, or otherwise scramble personal information that is ultimately passed to knowledge system 104 and used in various techniques described herein. Additionally, in various implementations, data passed between knowledge system 104 and client device 102, particularly to the extent that data may include personal or otherwise private information, may be encrypted, scrambled, censored, and so forth. Moreover, in various implementations, any learning performed by any components described herein (be they on client device 102 or knowledge system 104) may be based on monitoring user activity (e.g., switching applications, transitioning to standby, remaining idle for a particular time interval, etc.), as opposed to being based on monitoring user content.

In some implementations, data collected by user activity monitoring engine 116 may come in the form of one or more snapshots of user interaction with an application and/or states of an application or client device 102 generally. For example, in some implementations, user activity monitoring engine 116 may obtain one or more screenshots showing user interaction with an application. In other implementations, user activity monitoring engine 116 may interface with an application programming interface ("API") of an application to obtain one or more snapshots of the application's state. In some implementations, user activity monitoring engine 116 may interface with an accessibility API (e.g., screen readers for the blind) to obtain information about user interaction with an application.

User activity monitoring engine 116 may collect user interaction data continuously, or in response to various stimuli. For example, in the implementation depicted in FIG. 1, user activity monitoring engine 116 may take one or more snapshots indicative of user interaction with an application in response to a signal from interruption identification engine 114 that a user was likely interrupted. In other implementations, user activity monitoring engine 116 may continuously collect user interaction data. In some such implementations, user activity monitoring engine 116 may maintain a "sliding window" of recent user interaction data over a timeline of user interaction data. User interaction data occurring outside of the window (i.e., before) may be discarded as the sliding window progresses. In some implementations, the sliding window of recent user interaction data may be sized based on an amount of memory allocated to storing recent user interaction data. In other implementations, the sliding window of recent user interaction data may be sized to maintain a predetermined time interval's worth of user interaction data (e.g., two minutes).

User activity monitoring engine 116 may provide user interaction data, or otherwise make it available, to one or more other components, such as interruption identification engine 114 and/or one or more components of knowledge system 104. In some implementations, user activity monitoring engine 116 may provide user interaction data to knowledge system 104 in response to receipt, e.g., by user activity monitoring engine 116, of a signal from interruption identification engine 114 that a likely interruption has been detected.

In various implementations, one or more of interruption identification engine 114 and user activity monitoring engine 116 may perform their tasks on a per-application basis. In some such implementations, these components may not operate with regard to a particular application unless a user provides explicit permission. For example, suppose a user is installing a new application onto her smart phone. During installation, the user may be presented with an interface seeking the users' permission to provide the application with access to various components (e.g., the user's location, the user's calendar, etc.). In various implementations, such an interface may further seek the user's permission to provide interruption identification engine 114, user activity monitoring engine 116, and/or one or more components of knowledge system 104 with access to the application being installed. Access to the application may include but is not limited to the ability to take snapshots of the application (e.g., screen shots), and/or the ability to interface with the application's API.

In some implementations, one or more of interruption identification engine 114 and user activity monitoring engine 116 (which may in some instances be packaged together as an integral client application) may provide various user interfaces, such as a "to do" list of incomplete tasks, which may be presented in some implementations on a user's home screen. In some implementations, interruption identification engine 114 and/or user activity monitoring engine 116 may cause client device 102 to provide a user interface component that a user may operate to explicitly indicate that the user failed to complete a task. For example, one or both components may configure one or more soft keys on the user's smart phone (or may create a graphical user interface component on a touch screen) so that when operated, a designation that a task is incomplete is generated and stored. Permitting explicit designation of incomplete tasks in this manner may facilitate, for instance, training of one or more machine learning classifiers (described below) designed to determine likelihoods of tasks left incomplete. In some implementations, other user inputs may be used to explicitly designate a task as incomplete, such as voice commands, user gestures made using a mobile phone, and so forth.

Turning to knowledge system 104, user interaction data processing engine 124 may be configured to perform various types of processing on user interaction data received from client device 102 to prepare that data for analysis by downstream components such as natural language processing engine 126, complete task prediction engine 128, and/or task reminder engine 132. In implementations where user interaction data includes one or more screenshots of a user's interaction with an application (e.g., 106-112), user interaction data processing engine 124 may perform optical character recognition ("OCR") to extract text from the one or more screenshots. In implementations where user interaction data includes other types of data, such as snapshots of an application's state obtained by, for instance, user activity monitoring engine 116 through the application's API, user interaction data processing engine 124 may perform other types of processing to prepare the user interaction data for analysis by downstream components.

Natural language processing engine 126 may be configured to perform natural language processing on text extracted, for instance, by user interaction data processing engine 124, to identify text (e.g., sentence fragments/incomplete sentences authored by a user) indicative of incomplete tasks. Natural language processing engine 126 may employ a variety of techniques to extract text and/or to annotate user interaction data, including but not limited to co-reference resolution, grammars, regular expressions, objection completion, textual rewrites, heuristics, machine learning, and so forth.

Complete task prediction engine 128 may be communicatively coupled with an index 130 that may store, for instance, historical application interaction data. Based on this historical application interaction data, complete task prediction engine 128 may be configured to examine user interaction data collected by user activity monitoring engine 116, processed by user interaction data processing engine 124 and/or annotated by natural language processing engine 126. Complete task prediction engine 128 may then determine a likelihood that a user failed to complete (or completed) a task the user started with an application executing on client device 102.

Complete task prediction engine 128 may employ various techniques to predict likelihoods of incomplete tasks. For example, in some implementations, complete task prediction engine 128 may utilize one or more machine learning classifiers. Such classifiers may be trained on, for instance, a plurality of instances of user interaction with an application known to be associated with incomplete tasks. For example, historical application interaction data associated with an email application may be used to train a machine learning classifier that user input of a series of alphanumeric characters followed by some intervening event (e.g., switch applications, go to standby, etc.), without actuation of a "send" command, is indicative of an incomplete task.

Complete task prediction engine 128 may examine user interaction data in various ways to determine likelihoods of complete/incomplete tasks. In some implementations, complete task prediction engine 128 may determine that a state machine associated with a particular application has reached a particular state. For example, suppose that in phone application 112, an incoming call is ignored, and that incoming call is from someone deemed important to a particular user (e.g., based on call history, institutional relationship, personal relationship, etc.). Based on that particular state of phone application 112, complete task prediction engine 128 may determine that there is a particular likelihood that there is an outstanding incomplete task: call the missed caller back.

In some implementations, complete task prediction engine 128 may examine contents of one or more snapshots of an application to determine likelihood of a complete/incomplete task. For example, suppose a user begins writing a status update in a social networking application, but is interrupted and fails to complete a sentence. User interaction data processing engine 124 may extract the text of that incomplete sentence from one or more screenshots of the social networking application. Natural language processing engine 126 may identify (and in some implementations, annotate) the sentence fragment. Based on the identified/annotated sentence fragment, perhaps in combination with a failure by the user to press "submit," complete task prediction engine 128 may determine that there is a relatively high likelihood the user failed to complete the task of updating her social networking status.

In some implementations where complete task prediction engine 128 employs machine classifiers, training data may be based on explicit and/or implicit user indications of whether tasks are incomplete. For example, as mentioned above, interruption identification engine 114 and/or user activity monitoring engine 116 may provide an interface operable by a user to explicitly indicate that a task she is working on is being interrupted and therefore will be left incomplete, e.g., to create an instance of known task incompletion. Additionally or alternatively, one or more instances of a user being interrupted by events that may suggest task incompletion may yield an inferred instance of task incompletion. In some implementations, inferred instances of task incompletion may be assigned less weight than explicit instances.

In some implementations, machine learning classifiers may be trained based on training examples that each have an output parameter indicative of a task incompletion in an application and a vector of one or more input parameters associated with one or more parameters of the application and/or other aspect of a computing device when or before the task incompletion was indicated. For example, suppose an application has x different states. One input parameter for a training example could be a current state (when the task incompletion was indicated or inferred) of the x possible states of the application. Another input parameter could be how the user was interrupted (e.g., switched applications, received a phone call, transitioned to silent mode, etc.) Another input parameter could be the value of a particular variable in the application (e.g., text in a text entry field, selected value of a selection field, etc.). One or more natural language processing annotations (such as a designated sentence fragment) could be another input parameter. For example, a natural language processing annotation could indicate whether an incomplete sentence is present in one or more input fields of the application. Additional and/or alternative input parameters associated with an application and/or or other state of the computing device may be provided.

Suppose a user is interrupted while performing a task using a particular application, and that the user explicitly indicates that she failed to complete the task, e.g., using a soft key or a graphical user interface icon. Suppose complete task prediction engine 128 uses this explicit incomplete task as training data for a machine learning classifier, e.g., in the form of a vector of input parameters, $<P_1, P_2, P_3, P_4>$. When analyzing subsequent snapshots of the same application, task completion prediction engine 128 may output a likelihood that is based on how many parameters of vectors associated with the subsequent snapshots correspond to the training data and/or how closely those parameters correspond to the training data. For instance, a first subsequent snapshot of the application that includes an input vector that more closely corresponds to positive training examples than another snapshot may be deemed more likely to correspond to an incomplete task.

Complete task prediction engine 128 may be configured to update historical application interaction data stored in index 130 based on user feedback and/or other data indicative of accuracy of its predictions of incomplete task likelihoods. For example, user consumption, or lack thereof, of task reminders provided based on decisions made by complete task prediction engine 128 may constitute positive or negative feedback that may be used to modify one or more machine learning classifiers.

Task reminder engine 132 may be communicatively coupled with an index 134 that stores historical reminder consumption data. Historical reminder consumption data may include, for instance, data indicative of past user consumption of task reminders associated with various applications. Based on incomplete task likelihoods determined by complete task prediction engine 128, task reminder engine 132 may be configured to selectively generate and/or present task-completion reminders to users in manners selected based at least in part on this historical reminder consumption data.

Task reminder engine 132 may employ various techniques to select how task reminders are presented to users. In some implementations, task reminder engine 132 may select the manner in which a task-completion reminder is presented to a user using one or more machine learning classifiers. In various implementations, the one or more machine learning classifiers may be trained on a plurality of instances of task-completion reminder consumption, e.g., stored as historical reminder consumption data in index 134.

In some implementations in which task reminder engine 132 employs machine learning classifiers, instances of task completion reminder consumption may each include a vector of input parameters. These input parameters may vary widely, and may include but are not limited to how the task completion reminder was consumed, how long after consumption the task was completed, one or more likelihoods output by complete task prediction engine 128, whether a user explicitly liked or disliked (e.g., using a soft key or graphical user interface icon) the reminder, and so forth.

In various implementations, a machine learning classifier associated with task reminder engine 132 may provide various output. In some implementation, such a machine learning classifier may output a value that may be hashed, e.g., by task reminder engine 132, and then its hash may be matched to one or more of a plurality of potential manners in which to remind a user to complete a task (e.g., email, text, screen notification, etc.). In some implementations, a machine learning classifier may output a value that may be related, e.g., by task reminder engine 132 or another component, to a level of prominence at which a task-completion reminder is presented. Suppose complete task prediction engine 128 outputs a relatively high likelihood that a first task was left incomplete, but a relatively low likelihood that a second task was left incomplete. Task reminder engine 132 may present a task-completion reminder for the first task with a higher level of prominence (e.g., screen notification combined with audible and/or haptic feedback) than a task-completion reminder for the second task (e.g., an email).

In some implementations, a time before a task-completion reminder is provided may also be selected based on various outputs of one or more machine learning classifiers associated with task reminder engine 132 and/or complete task prediction engine 128. Suppose complete task prediction engine 128 outputs a relatively high likelihood that a first task was left incomplete, but a relatively low likelihood that a second task was left incomplete. Task reminder engine 132 may present a task-completion reminder for the first task sooner (e.g., minutes later) than a task-completion reminder for the second task (e.g., hours or days later).

In some implementations, separate machine learning classifiers may be trained and/or employed on a per-application (e.g., 106-112) basis and/or on a per-user basis. In various implementations, task reminder engine 132 may modify one or more machine learning classifiers based on feedback, e.g., from users, indicative of consumption by users of task-completion reminders. For example, if users generally ignore text messages reminding them to complete a particular task on a particular application, but are more responsive to screen notifications, task reminder engine 132 may favor screen notifications moving forward.

Task-completion reminders may take various forms, including but not limited to text messages, screen notifications (e.g., on locked and/or home screens), pop-up windows, audio notifications (e.g., beeps, tones, etc.), haptic feedback (e.g., vibrations), emails, voicemails, social networking messages, and so forth. In some implementations, an application for which an incomplete task was detected may be scheduled, e.g., by task reminder engine 132 or by the application itself at the request of task reminder engine 132, to be opened automatically some time later and prompt the user to complete the task.

While various components are depicted in FIG. 1 as being part of client device 102 or knowledge system 104, this is not meant to be limiting. Various components may be added, omitted, or implemented differently than shown. For example, one or more components depicted in FIG. 1 as being part of knowledge system 104, such as user interaction data processing engine 124, natural language processing engine 126, complete task prediction engine 128, and/or task reminder engine 132, may be implemented on client device 102, and/or on both client device 102 and knowledge system 104. Likewise, components depicted in FIG. 1 as being implemented on client device 102, such as interruption identification engine 114 and/or user activity monitoring engine 116, may be implemented in whole or in part on knowledge system 104. In various implementations, various components of client device 102 and/or knowledge system 104, such as one or more of 114, 116, 124, 126, 128, and/or 132, may be implemented using software, hardware (e.g., using an application-specific integrated circuit, or "ASIC"), or any combination of the two.

Figure 2:
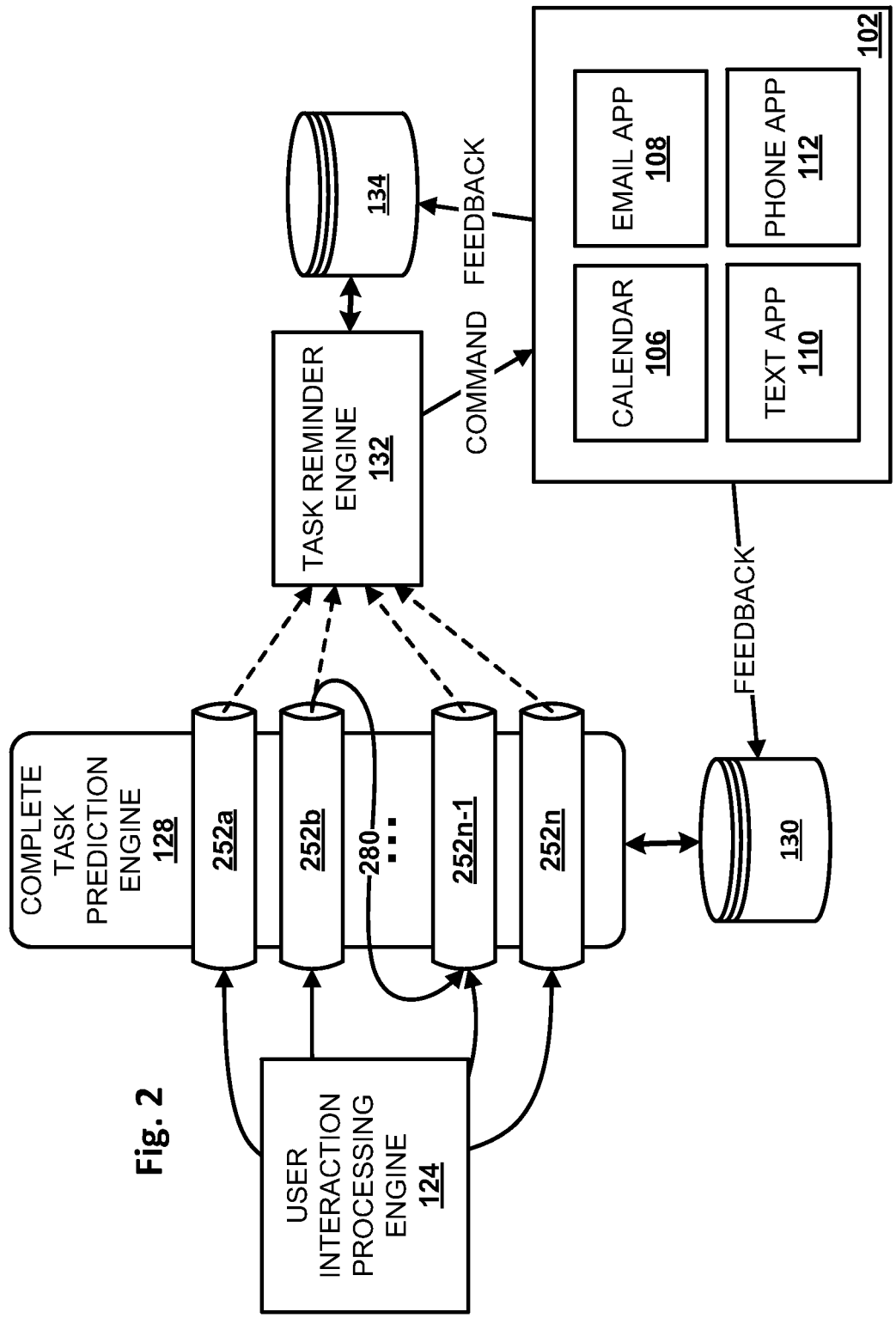
FIG. 2 depicts one example of how user interaction data may be analyzed to determine whether to generate and send a task-completion reminder, in accordance with various implementations.

FIG. 2 depicts one example of how user interaction data may be processed by various components of knowledge system 104, in accordance with various implementations. User interaction data processing engine 124 may provide user interaction data to complete task prediction engine 128. Although not depicted in this example, in some implementations, natural language processing engine 126 may process/annotate user interaction data further before it arrives at complete task prediction engine 128.

In this example, complete task prediction engine 128 includes a plurality of processing pipelines 252a-252n (generically referred to as "processing pipelines 252"). In some implementations, each processing pipeline 252 may be associated with a separate application (e.g., 106-112). Each processing pipeline 252 may represent an algorithm to analyze user interaction data to determine a likelihood that a user failed to complete a task in a particular application. For example, first processing pipeline 252a may include an algorithm designed to determine likelihoods that users failed to complete tasks associated with calendar application 106. Second processing pipeline 252b may include an algorithm designed to determine likelihoods that users failed to complete tasks associated with email application 108. And so on.

In some implementations, each processing pipeline 252 may include a separate machine learning classifier trained on historical application interaction data stored in index 130. In some implementations, the same user interaction data may be processed by multiple processing pipelines in parallel. The assumption may be that a pipeline associated with an application that is entirely unrelated to the user interaction data would yield a relatively low likelihood of an incomplete task.

In some implementations, output from one pipeline 252 may be provided to another pipeline as indicated by arrow 280, e.g., in addition to or instead of being provided to downstream components such as task reminder engine 132. For instance, suppose a first pipeline 252 outputs a mid-level likelihood (say, 50%) that a user failed to complete a task associated with one application, but a second pipeline 252 outputs a relatively high likelihood that the user failed to complete a task associated with another application. The relatively high likelihood output by the second pipeline 252 may be provided as an input to the first pipeline 252, and may cause the first pipeline to increase or decrease its determined likelihood.

Output from one pipeline 252 may be provided to another for other reasons as well. It is likely that a volume of raw user interaction data produced by multitudes of users may be very large. Accordingly, in some implementations, one or more basic data processing pipelines 252 may be provided to harvest relatively high level information (e.g., signals) from user interaction data, e.g., to separate the "wheat" from the "chaff." In some implementations, these pipelines may perform one or more operations described above as being performed by user interaction data processing engine 124 and/or natural language processing engine 126. For example, a pipeline may extract high level signals such as snapshots of user interaction with one or more applications. Output of these basic data processing pipelines 252 may be provided to other pipelines 252, e.g., as depicted by arrow 280. These other pipelines 252 may employ various techniques, such as machine learning models, etc., to determine likelihoods that users failed to complete tasks associated with applications.

Output of complete task prediction engine 128 may be provided to task reminder engine 132. As indicated by the dashed arrows in FIG. 2, in some implementations, complete task prediction engine 128 may selectively provide output indicative of likelihoods that users failed to complete tasks. For example, for a given processing pipeline 252, complete task prediction engine 128 may only provide output to task reminder engine 132 if the determined likelihood satisfies a threshold. In other implementations, all likelihoods, no matter how low, may be provided to task reminder engine 132.

Task reminder engine 132 may analyze output provided by complete task prediction engine 128 and in response, cause (in some cases selectively based on received likelihoods) task-completion reminders to be presented to users in manners selected based at least in part on historical reminder consumption data stored in index 134. For example, in some implementations, task reminder engine 132 may provide one or more commands to various downstream components, such as applications 106-112 executing on client device 102, to present one or more task reminders to a user operating client device 102.

Figure 3:
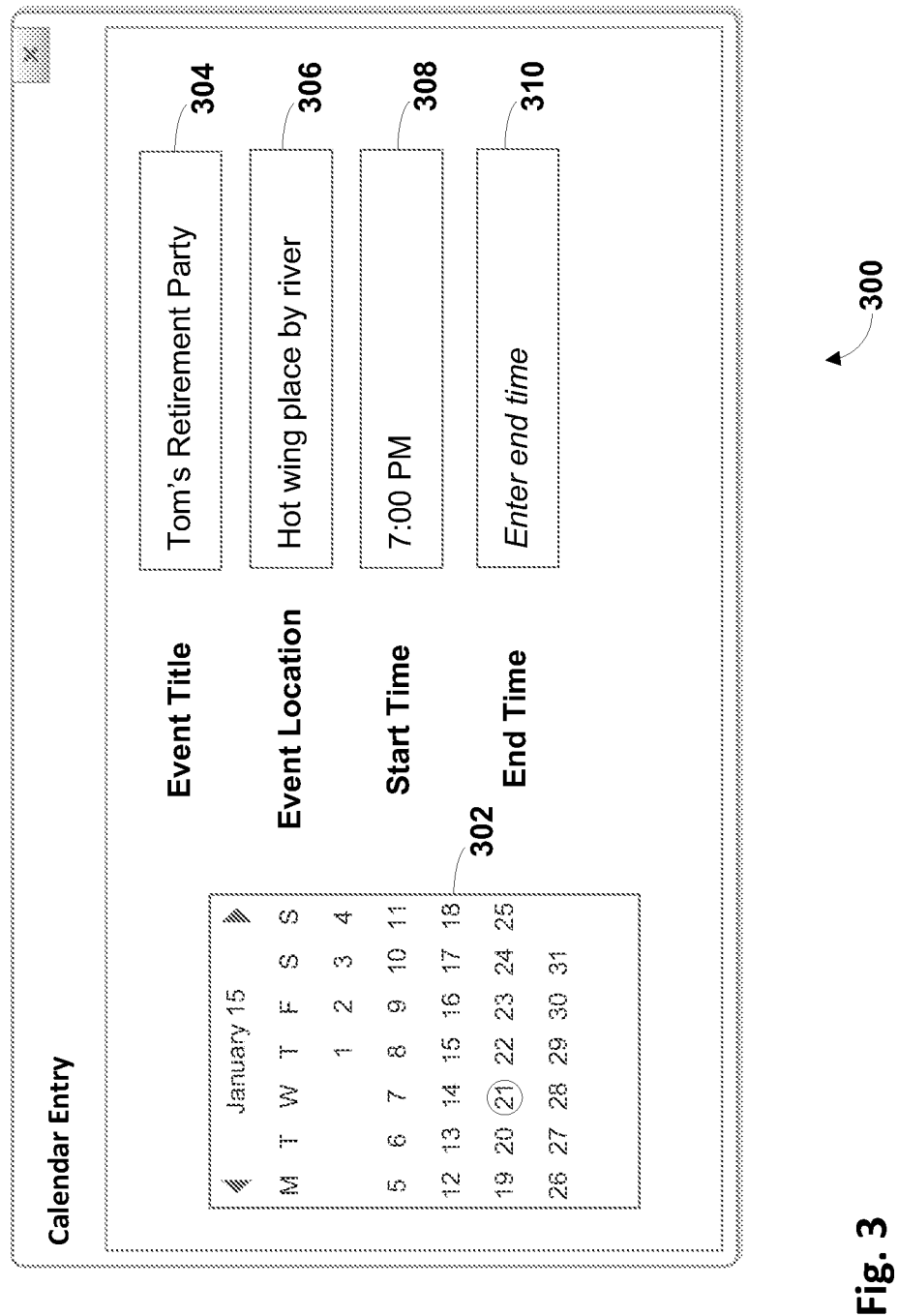
FIG. 3 depicts an example snapshot of an application interface that may be analyzed to determine that a task has been left incomplete, in accordance with various implementations.

Complete task prediction engine 128 and/or task reminder engine 132 may receive feedback about the decisions they make from various sources. In implementations in which one or both of these components employ machine learning classifiers, that feedback may be in the form of positive, neutral, and/or negative feedback. As shown in FIG. 3, feedback may come from client device 102, e.g., via one or more applications 106-112.

Suppose client device 102 is a mobile phone on which an audible notification (e.g., a beep) to complete a calendar entry is provided, e.g., in response to a user operating calendar application 106 to create a calendar entry with a date and title, and location, but no start or finish time. Suppose further that the user dismisses the notification (e.g., by swiping it away) without ever opening calendar application 106 to complete the calendar entry. The user's dismissal may constitute negative feedback for complete task prediction engine 128, e.g., indicating that the user had in fact completed the calendar entry and that the user does not consider start and finish times to be essential features of a calendar entry. Such feedback may be stored in various forms in index 130, e.g., by complete task prediction engine 128.

Alternatively, suppose the user swipes away the notification, but then sometime later completes the calendar entry. This time, the user's dismissal may constitute negative feedback for task reminder engine 132, at least pertaining to the specific audible notification. Perhaps the user dislikes audible reminders. However, the fact that the user did complete the task later may also provide some constructive feedback to task reminder engine 132, e.g., that while the user does not like audible reminders, perhaps a more subtle reminder (e.g., visual notification, blinking light, etc.) may be better-received. Additionally, the later completion of the calendar entry may constitute positive feedback for complete task prediction engine 128. Start and finish times may be essential to this particular user after all for completion of a calendar entry.

FIG. 3 depicts an example user interface 300 for creating and/or editing a calendar entry. Interface 300 includes various fields, such as an interactive calendar 302 that a user may operate to select one or more dates, an event title field 304, an event location field 306, a start time field 308, and an end time field 310. Interface 300 is presented for demonstration purposes only, and is not meant to be limiting. Various calendar applications may include more or less data entry fields for creating and/or editing calendar entries.

In this example, the event date (January 21) has been selected, an event title has been entered into event title field 304, a location has been entered into location field 306, and a start time has been entered into start time field 308. However, end time field 310 has been left empty, and the provided location ("Hot wing place by river") is in a colloquial form, as opposed to being a known location such as a postal address or identifiable from a knowledge base of entities such as people, places, events, etc. Now, suppose user interface 300 is closed, swapped for another application, and/or left in an unaltered state for a predetermined time interval before these incomplete fields are completed. Based on the failure to provide any data for the end time and/or a more "complete" version of the colloquial form of the location, complete task prediction engine 128 may determine a likelihood that the user failed to complete this calendar entry. If the likelihood satisfies one or more thresholds, task reminder engine 132 may cause a task-completion reminder to be presented to the user.

Figure 4:
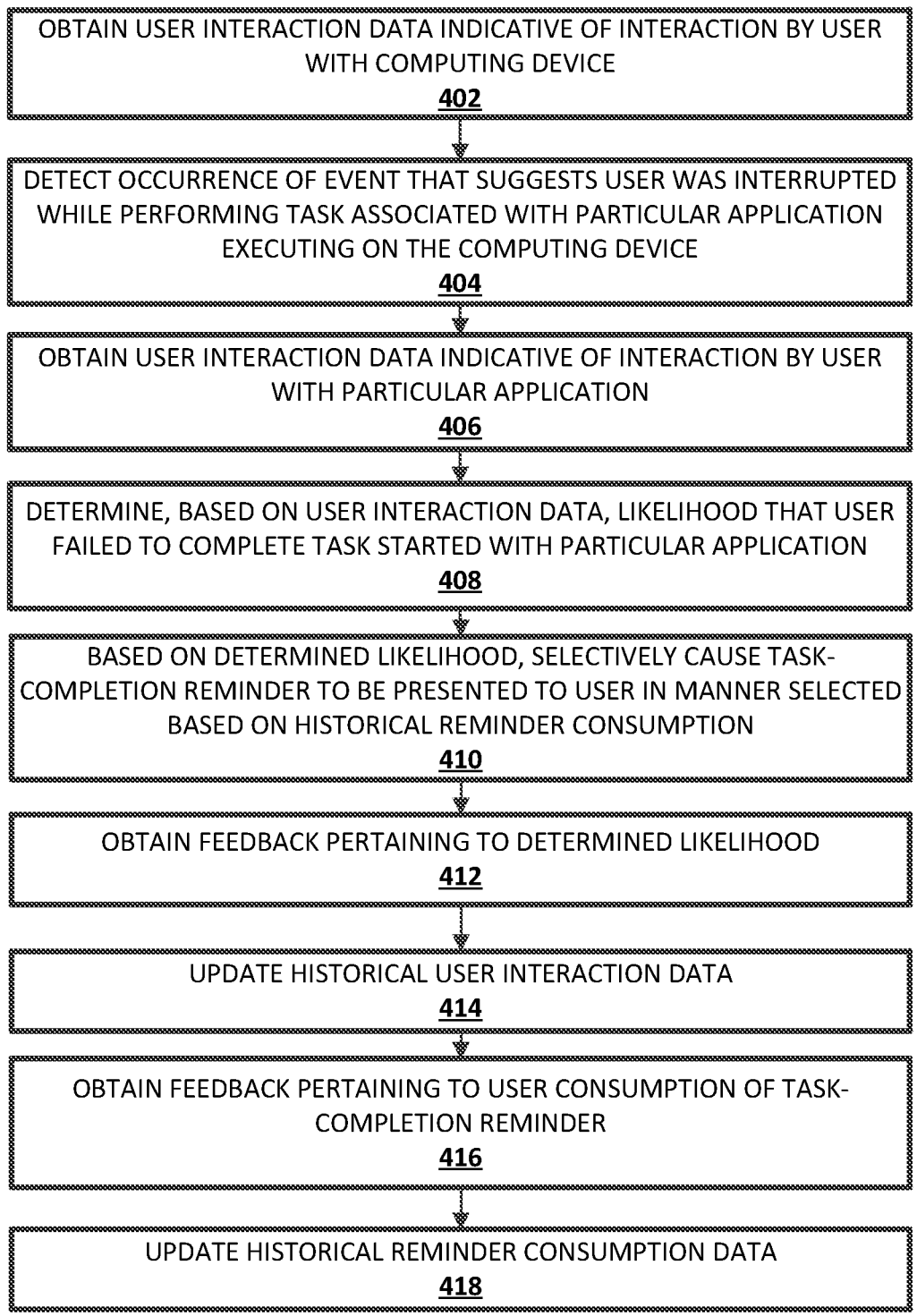
FIG. 4 schematically depicts an example method of determining a likelihood of an incomplete task and selectively providing a reminder thereof, in accordance with various implementations.

Referring now to FIG. 4, an example method 400 that incorporates various techniques described herein is depicted. For convenience, the operations of the flow chart are described with reference to a system that performs the operations. This system may include various components of various computer systems, including various engines described herein. Moreover, while operations of method 400 are shown in a particular order, this is not meant to be limiting. One or more operations may be reordered, omitted or added.

At block 402, the system may obtain user interaction data indicative of interaction of a user with a computing device such as client device 102. For example, the system may monitor for events that suggest possible interruption of a user while performing a task with an application. Such events may include but are not limited to switching applications (especially where client device 102 is a mobile phone or tablet computer with a small screen configured to display one application at a time), remaining idle for a time interval, passage of at least a predetermined time interval without user interaction with an application, transitioning client device 102 to a standby mode, turning a mobile phone to silent or vibrate mode, and so forth. At block 404, the system may detect occurrence of such an event, e.g., based on the data indicative of user interaction with the computing device obtained at block 402.

At block 406, the system may obtain user interaction data indicative of user interaction with a particular application (e.g., 106-112 in FIG. 1) that occurred contemporaneously with the event occurrence detected at block 404. For example, user activity monitoring engine 116 may obtain one or more snapshots (e.g., screenshots, states of the application obtained from an API, etc.) of user interaction with an application, such as a snapshot of the calendar entry user interface 300 of FIG. 3 in its depicted state.

Based on the user interaction data obtained at block 406, at block 408, the system may determine a likelihood that the user failed to complete a task started with the particular application. For example, complete task prediction engine 128 may analyze the empty and/or incomplete fields of user interface 300 to determine, based on past instances of known incomplete tasks, a likelihood that this particular calendar entry was not completed.

Based on the likelihood determined at block 408, at block 410, the system may selectively cause a task-completion reminder to be presented to the user. In various implementations, the system (e.g., via task reminder engine 132) may cause the task-completion reminder to be presented when the likelihood determined at block 408 satisfies one or more predetermined thresholds. In various implementations, the system (e.g., via task reminder engine 132) cause the task-completion reminder to be presented in a manner the system selects based on historical consumption data, e.g., stored in index 134. For example, if email users are historically more responsive to task-completion reminders in email form than they are to haptic reminders (e.g., phone vibrating), the system may elect to provide a task-completion reminder via email.

At block 412, the system may obtain, e.g., from applications 106-112 or from other sources, feedback pertaining to the likelihood determined at block 408. In some implementations, a user may provide explicit feedback about the likelihood. For example, after receiving a task-completion reminder, a user may operate a user interface (on the task-completion reminder or elsewhere) to provide an indication that the user agreed or disagreed that the user did in fact fail to complete a task. Suppose the filled-in information on the calendar entry depicted in FIG. 3 is sufficient for a particular user. Perhaps the user knows exactly where the "hot wing place by the river" is located, and doesn't care about the event's end time (which could be open-ended, for instance). When presented with a reminder to complete the calendar entry, the user may operate one or more graphical user interface elements (e.g., a button labeled "Already Completed") configured to indicate that the user considers the calendar event to be complete. This may, for instance, provide negative feedback to a machine learning classifier configured to determine likelihoods that the user (or users in general) failed to complete calendar entries. In other implementations, user feedback may be implicit. For example, as noted above, if a user dismisses a task-completion reminder without ever going back to complete the task, that may constitute tacit negative feedback. At block 414, the system may update historical application interaction data associated with the particular application-at-issue, e.g., which may be stored in index 130, based on the feedback.

At block 416, the system may obtain, e.g., from applications 106-112 or from other sources, feedback pertaining to user consumption of the task-completion reminder presented at block 410. In some implementations, a user may provide explicit feedback about the manner in which she received a task-completion reminder. For example, a user may operate a user interface on the task-completion reminder or elsewhere to provide an indication that the user liked or did not like the manner in which the task-completion reminder was presented to her. Suppose a user receives the task-completion reminder as an email delivered to a personal email address. The user may operate a user interface (e.g., rendered on client device 102 by or on behalf of interruption identification engine 114 or user activity monitoring engine 116) to indicate that she does not wish to receive task-completion reminders at her personal email address. In some implementations, the user may further operate the user interface to indicate that she'd prefer to receive task-completion notifications in other manners, e.g., via text message, at a business email address, or as notifications on a mobile phone screen.

In various implementations, user feedback pertaining to user consumption of task reminders may additionally or alternatively be implicit. For example, suppose a user dismisses a task-completion reminder, and then after some time interval (e.g., one or more hour, days) goes back and completes the task (perhaps after consuming another task-completion reminder in a different form). That may indicate that the user wanted to be reminded to complete the task, but not in the manner that the task-completion reminder was initially presented. At block 418, the system may update historical reminder consumption data pertaining to the particular user or users in general, which in some implementations may be stored in index 134, based on feedback received at block 416.

Figure 5:
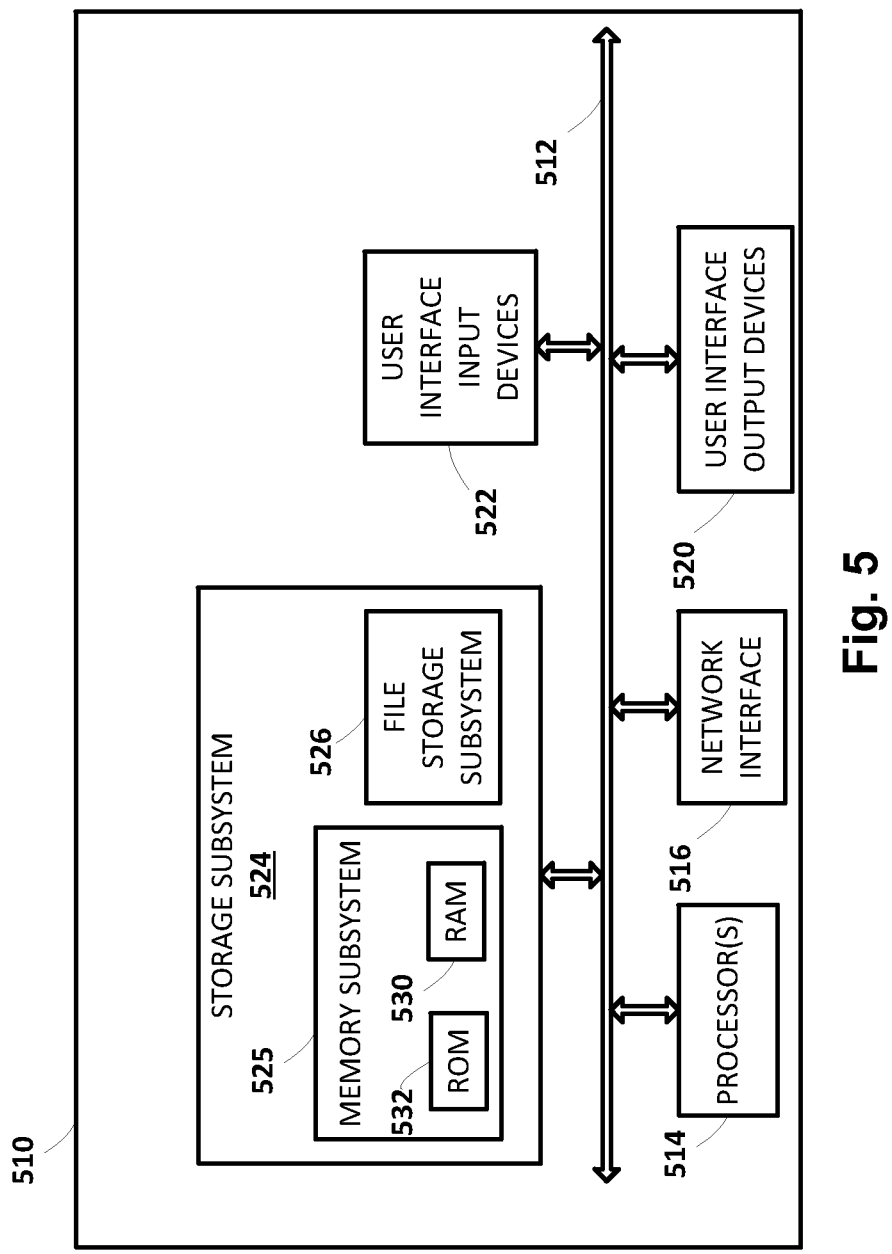
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400 and/or to implement one or more of interruption identification engine 114, user activity monitoring engine 116, user interaction data processing engine 124, natural language processing engine 126, complete task prediction engine 128, and/or task reminder engine 132.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    obtaining, by a computing system, user interaction data indicative of interaction by a user with a computing device executing an application, wherein the interaction occurs during a sliding window time interval associated with a sliding window of recent user interaction data that is maintained over a timeline of user interaction data, and wherein the user interaction data includes a sequence of screenshots captured during the sliding window time interval;
    detecting, by the computing system by applying a machine learning model to the sequence of screenshots, occurrence of an event that suggests the user has been interrupted while performing a task associated with the application, wherein the machine learning model is trained on past sequences of screenshots known to be associated with incomplete tasks;
    in response to the detecting:
        selecting, by the computing system, based on historical task reminder consumption data, a manner for outputting a task reminder to complete the task, wherein the historical task reminder consumption data includes data indicative of observed past consumption of task reminders, and
        selecting, by the computing system, based on the historical task reminder consumption data, a non-zero amount of time to delay after the detecting before outputting the task reminder;
    causing, by the computing system, the task reminder to be output to the user at the same computing device or a different computing device in the selected manner, wherein the task reminder is output at the same computing device or the different computing device in response to the selected amount of time elapsing after the detecting; and
    opening the application to prompt the user to complete the task.

2. The computer-implemented method of claim 1, wherein the event comprises one or more of a transition between applications on the computing device, passage of at least an inactivity time interval without user interaction with the application, and transition of the computing device to a standby state.

3. The computer-implemented method of claim 1, wherein the detecting is based on historical application interaction data associated with the application.

4. The computer-implemented method of claim 1, further comprising modifying the machine learning model based on feedback from the user indicative of accuracy of the detecting.

5. The computer-implemented method of claim 1, wherein the detecting comprises performing natural language processing on text input by the user to the application to identify one or more sentence fragments authored by the user using the application.

6. The computer-implemented method of claim 1, further comprising selecting the manner for outputting the task reminder to the user using another trained machine learning model.

7. The computer-implemented method of claim 6, wherein the another machine learning model is trained on a plurality of instances of reminder consumption forming part of the historical task reminder consumption data.

8. The computer-implemented method of claim 6, further comprising further training modifying the another machine learning model based on feedback indicative of consumption by the user of the task reminder.

9. The computer-implemented method of claim 1, wherein the application is a first application, and operations of obtaining and detecting are performed by a second application that is distinct from the first application.

10. A system including memory and one or more processors operable to execute instructions stored in the memory, comprising instructions to:

detect, based on user interaction with a computing device, occurrence of an event that suggests a user has been interrupted while performing a task associated with an application executing on the computing device;
obtain user interaction data indicative of interaction by the user with the application from a sliding window of recently captured user interaction data that is contemporaneous with occurrence of the event, wherein the interaction occurs during a time interval associated with the sliding window, and wherein the user interaction data includes a sequence of screenshots captured during the time interval;
determine, by applying a machine learning model to the sequence of screenshots, that the user failed to complete a task associated with the application, wherein the machine learning model is trained in past sequences of screenshots known to be associated with incomplete tasks;
select, based on historical task reminder consumption data, a manner for outputting a task reminder to complete the task;
select, based on the historical task reminder consumption data, a non-zero amount of time to delay before outputting the task reminder; and
output the task reminder to the user in the selected manner, wherein the task reminder is output in response to the selected amount of time elapsing after the determination that the user failed to complete the task.

11. The system of claim 10, further comprising instructions to:
provide the user interaction data to a remote computing system;
wherein the determining comprises receiving, from the remote computing system, an indication that the user failed to complete the task associated with the application.

12. The system of claim 10, wherein the instructions further comprise instructions to:
determine, based on the user interaction data, a likelihood that the user failed to complete the task associated with the application.

13. The system of claim 10, wherein the event comprises one or more of a transition between applications on the computing device, passage of at least an inactivity time interval without user interaction with the application, and transition of the computing device to a standby state.

14. A method implemented using one or more processors, comprising:
obtaining, from a computing device operated by a user that executes an application, user interaction data indicative of interaction by the user with the computing device, wherein the interaction occurs during a time interval associated with a sliding window of recent user interaction data that is maintained over a timeline of user interaction data, and wherein the user interaction data includes a sequence of application programming interface ("API") states captured during the time interval;
detecting, by applying a machine learning model to the sequence of API states, occurrence of an event that suggests the user has been interrupted while performing a task associated with the application, wherein the machine learning model is trained on past sequences of API states snapshots known to be associated with incomplete tasks;
in response to the detecting:
selecting, by the computing system, based on historical task reminder consumption data, a manner for outputting a task reminder to complete the task, wherein the historical task reminder consumption data includes data indicative of observed past consumption of task reminders, and
selecting, by the computing system, based on the historical task reminder consumption data, a non-zero amount of time to delay after the detecting before outputting the task reminder; and
transmitting data to a different computing device operated by the user to cause the task reminder to be output to the user at the different computing device in the selected manner, wherein the task reminder is output at the different computing device in response to the selected amount of time elapsing after the detecting.

15. The at least one non-transitory computer-readable medium of claim 14, wherein the sequence of API states comprises a sequence of accessibility API states.

* * * * *